(12) United States Patent
Cao

(10) Patent No.: US 12,088,088 B2
(45) Date of Patent: Sep. 10, 2024

(54) ELECTRONIC DELAY WITH STABILIZED OUTPUT VOLTAGE AND OVER CURRENT/SHORT CIRCUIT PROTECTION

(71) Applicant: Rockwell Automation Technologies, Inc., Mayfield Heights, OH (US)

(72) Inventor: Ji Jun Cao, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 275 days.

(21) Appl. No.: 17/857,089

(22) Filed: Jul. 4, 2022

(65) Prior Publication Data

US 2024/0006875 A1    Jan. 4, 2024

(51) Int. Cl.
| | | |
|---|---|---|
| H02P 27/06 | (2006.01) | |
| H02H 7/125 | (2006.01) | |
| H02M 1/32 | (2007.01) | |
| H02M 7/217 | (2006.01) | |

(52) U.S. Cl.
CPC ............ *H02H 7/1257* (2013.01); *H02M 1/32* (2013.01); *H02M 7/217* (2013.01); *H02P 27/06* (2013.01)

(58) Field of Classification Search
CPC ...... H02H 7/1257; H02M 1/32; H02M 7/217; H02P 27/06
See application file for complete search history.

(56) References Cited

U.S. PATENT DOCUMENTS

| | | | | |
|---|---|---|---|---|
| 4,683,529 A | * | 7/1987 | Bucher, II | ........... H02M 3/1563 363/44 |
| 4,949,214 A | * | 8/1990 | Spencer | .................. G03G 15/16 361/96 |
| 7,602,158 B1 | * | 10/2009 | Iacob | ................ H02M 3/33523 307/17 |
| 9,184,669 B2 | * | 11/2015 | Tsutsui | .................... H02P 29/02 |
| 2013/0308356 A1 | * | 11/2013 | Subramanium | ..... H02M 1/4258 363/53 |

OTHER PUBLICATIONS

ABB data sheet "Product Details 1VCF339750S7904, Auxillary relay D-KT-KFT for time delay 0,5-3s of undervoltage release YU-MU-MBU aux.voltage 48Vdc/ac for HD4, VD4, eVD4, Vmax", https://new.abb.com/products/1VCF339750S7904/1vcf339750s7904, 2022.

* cited by examiner

*Primary Examiner* — Thai T Dinh

(57) ABSTRACT

A system includes a circuit breaker and a delay circuit. The circuit breaker has a coil to enable control of a contact to selectively couple a load to a power source responsive to a coil voltage signal applied to the coil. The delay circuit has a depletion mode MOSFET and an energy storage circuit. The depletion mode MOSFET is controlled as an active current sink to provide the coil voltage signal based on a DC voltage signal. The energy storage circuit has an input coupled to a drain of the depletion mode MOSFET, a capacitor, and an output coupled to the drain of the depletion mode MOSFET, the energy storage circuit charges the capacitor from the DC voltage signal and delivers current to the depletion mode MOSFET to delay discontinuation of the coil voltage signal responsive to a drop or discontinuation of the DC voltage signal.

20 Claims, 3 Drawing Sheets

ELECTRONIC DELAY WITH STABILIZED OUTPUT VOLTAGE AND OVER CURRENT/SHORT CIRCUIT PROTECTION

BACKGROUND INFORMATION

Circuit breakers with an under voltage (UV) coil are used for system protection in motor drives. Operating the breaker coil from a control transformer, however, can allow coil voltages higher than a rated coil voltage. Also, temporary sags in the supply voltage can cause the circuit breaker to open and lead to unwanted service interruption.

BRIEF DESCRIPTION

In one aspect, a power conversion system includes rectifiers, an inverter, a circuit breaker, and a delay circuit. A first rectifier has a first rectifier output configured to provide a DC voltage signal, and a second rectifier has a second rectifier output. The inverter has an inverter input coupled to the second rectifier output, and an inverter output configured to drive a motor load. The circuit breaker has a coil configured to enable control of a contact to selectively couple an input of the second rectifier to a power source responsive to a coil voltage signal applied to the coil, and the delay circuit has a depletion mode MOSFET controlled as an active current sink to provide the coil voltage signal based on the DC voltage signal.

In another aspect, a system includes a circuit breaker and a delay circuit. The circuit breaker has a coil configured to enable control of a contact to selectively couple a load to a power source responsive to a coil voltage signal applied to the coil. The delay circuit has a depletion mode MOSFET and an energy storage circuit. The depletion mode MOSFET is controlled as an active current sink to provide the coil voltage signal based on a DC voltage signal, and the energy storage circuit has an input coupled to a drain of the depletion mode MOSFET, a capacitor, and an output coupled to the drain of the depletion mode MOSFET. The energy storage circuit charges the capacitor from the DC voltage signal and delivers current to the depletion mode MOSFET to delay discontinuation of the coil voltage signal responsive to a drop or discontinuation of the DC voltage signal.

In a further aspect, a method of controlling a circuit breaker includes controlling a depletion mode MOSFET as an active current sink to provide a coil voltage signal to a coil of a circuit breaker to enable control of a contact of the circuit breaker, charging a capacitor from a DC voltage signal, and delivering current from the capacitor to the depletion mode MOSFET to delay discontinuation of the coil voltage signal responsive to a drop or discontinuation of the DC voltage signal.

DETAILED DESCRIPTION

Figure 1:
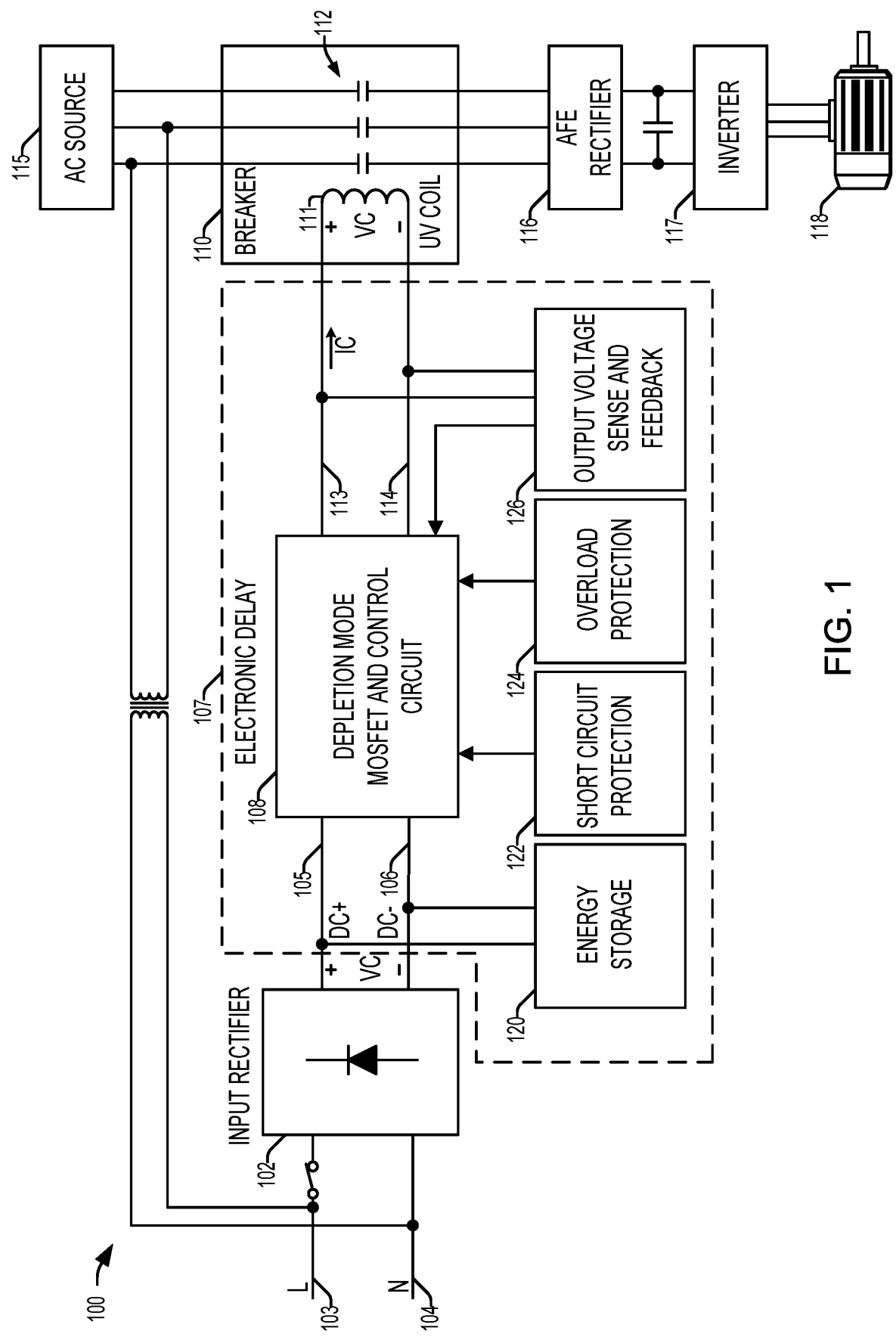
FIG. 1 is a schematic diagram of a power conversion system.

Referring now to the figures, several embodiments or implementations are hereinafter described in conjunction with the drawings, wherein like reference numerals are used to refer to like elements throughout, and wherein the various features are not necessarily drawn to scale.

Figure 2:
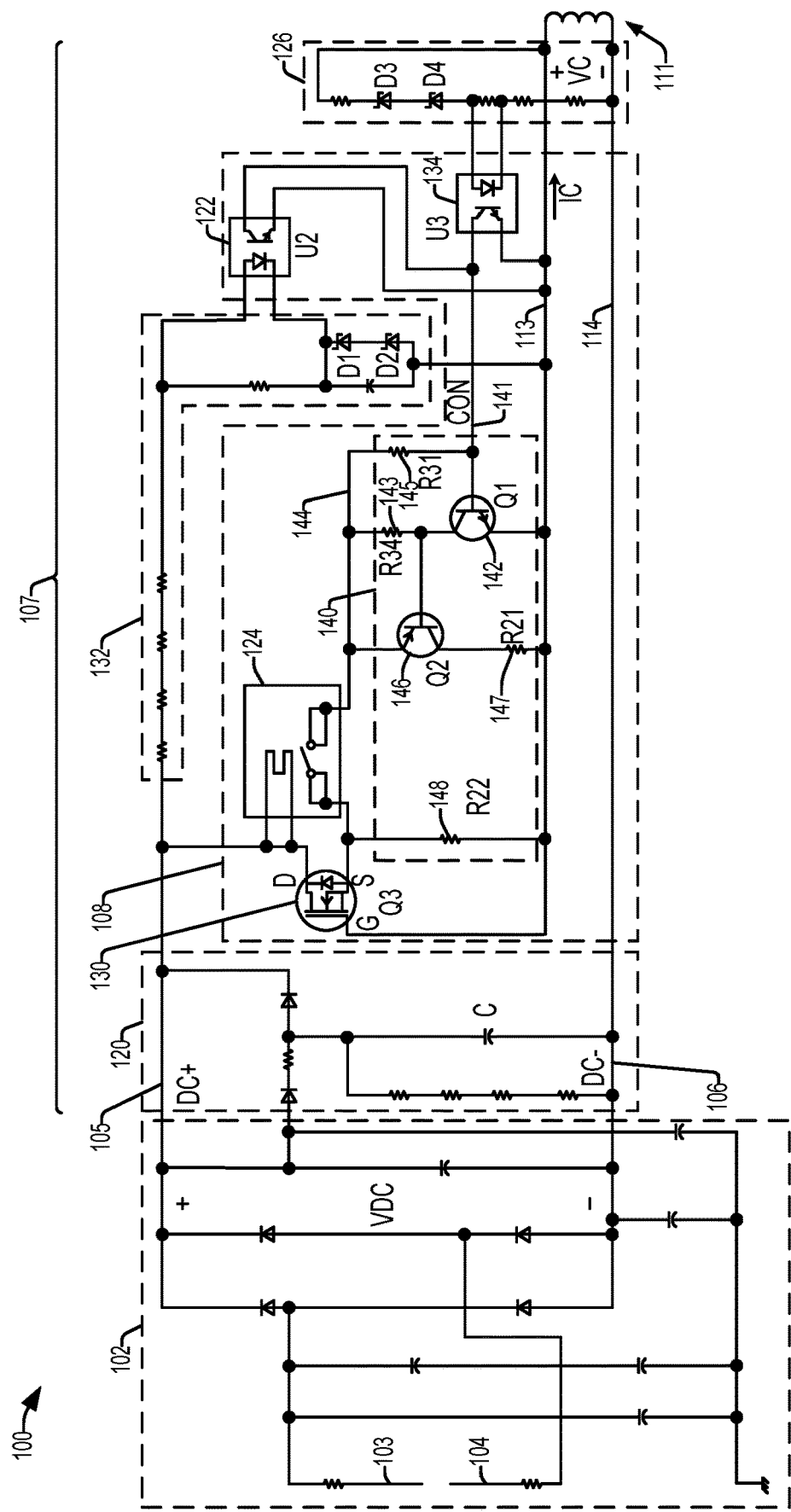
FIG. 2 is a schematic diagram of an implementation of the power conversion system.

FIG. 1 shows a power conversion system 100 with an electronic delay circuit and FIG. 2 shows further details of an example implementation of the delay circuit. The power conversion system 100 in the illustrated example is a motor drive with a first rectifier 102 having an input that receives AC input power at input terminals 103 (e.g., an input line voltage labeled "L") and 104 (e.g., a neutral also labeled "N") from a control transformer. A central controller of the power conversion system (not shown) controls a switch to selectively couple the first rectifier 102 to the L input terminal 103. If the switch is closed, the delay unit is powered. After the system 100 is powered, the control firmware (not shown) in one example performs a self-test, and if everything is proper, closes the switch to enable the circuit breaker operation by powering the rectifier 102 and the firmware implements a procedure to close circuit breaker contacts to power the system, such as charging a spring (not shown), closing contacts 112, and waiting for an opening command from a host system. The first rectifier 102 has a first rectifier output with a first DC output terminal 105 (e.g., positive, also labeled "DC+") and a second DC output terminal 106 (e.g., negative or reference, also labeled "DC−"). The DC output of the first rectifier 102 is configured to provide a DC voltage signal VDC when the circuitry is powered and operating.

The system 100 includes a delay circuit 107 with a depletion mode metal-oxide-semiconductor field effect transistor (MOSFET) and control circuit 108 to enable controlled operation of a circuit breaker 110 with a coil 111 and contacts 112. In operation, with the system 100 powered, the depletion mode MOSFET and control circuit 108 operates as an active current sink to provide a coil voltage signal VC to the coil 111 based on the DC voltage signal VDC. In one example, the coil 111 enables control of the opening or closing of the contacts 112. For example, a circuit breaker 110 with large current rating may include a closing coil, an opening coil, a spring charging coil to control the opening/closing of the breaker, along with control signals for opening/closing/charging that may be removed once the tasks are completed. but the delay circuit enables control of the coil 111 by these or other control signals. In operation in one example, the coil 111 advantageously opens after a delay time to prevent the contacts 112 from being closed when the input power is removed accidently, otherwise, the system could be at risk when the power comes back.

The depletion mode MOSFET and control circuit 108 has first and second outputs 113 and 114 coupled to respective terminals of the circuit breaker coil 111. The circuit breaker coil 111 enables control of the contacts 112 to selectively couple a power source 115 to an input of a second rectifier 116 responsive to the coil voltage signal VC applied to the coil 111. The second rectifier 116 in one example is an active front end (AFE) three phase rectifier with rectifier switches (e.g., transistors, IGBTs, etc.) that convert three-phase AC input power to provide a DC bus voltage at a second rectifier output. The DC bus voltage is applied as an input to a switching inverter 117. The inverter 117 has an inverter input coupled to the second rectifier output, and an inverter output configured to drive a motor load 118. The inverter 117 includes inverter switching devices (e.g., transistors, IGBTs, etc.) that convert the DC bus voltage to single or multiphase AC output signals to control operation of the motor load 118.

The depletion mode MOSFET and control circuit 108 provides the coil voltage signal VC to the circuit breaker coil 111 and controls a coil current IC of the coil 111. The operation of the depletion mode MOSFET in the circuit 108 allows adaptation of the system 100 to a wide range of AC input voltages without undue service interruptions. In addition, the delay circuit 107 includes an energy storage circuit 120 that provides a controlled delay to continue application of the coil voltage signal VC in the presence of drop or discontinuation of the DC voltage signal VDC, as well as a short circuit and overload protection circuit 122 that limits the coil current IC to a first value responsive to a detected short-circuit condition, an overload protection circuit 124 that limits the coil current IC to the first value responsive to a detected overload condition, and an output voltage sense and feedback circuit 126 that senses the coil voltage signal VC applied to the coil 111.

FIG. 2 shows an example implementation of the delay circuit 107 in the power conversion system 100. The circuit 108 includes a depletion mode MOSFET 130 (e.g., also labeled "Q3") with a drain ("D") coupled to the first DC output terminal 105, a gate ("G") coupled to the first output 113, and a source ("S"). The circuit 108 includes a voltage sensing circuit 132 that senses a voltage of the depletion mode MOSFET 130, and a regulator 134 to control the coil current IC to regulate the coil voltage signal VC according based on the DC voltage signal VDC. The circuit breaker coil 111 has a first (e.g., upper) terminal coupled to the first output 113 of the depletion mode MOSFET and control circuit 108, and a second (e.g., lower) terminal coupled to the second output 114 of the depletion mode MOSFET and control circuit 108. The second output 114 of the depletion mode MOSFET and control circuit 108 is coupled to the second DC output terminal 106 of the first rectifier 102. In operation, the coil current IC from the depletion mode MOSFET and control circuit 108 flows from the first output 113 through the coil 111 and returns by the second output 114 to the second DC output terminal 106 of the first rectifier 102.

The energy storage circuit 120 in this example has an input coupled to the first rectifier output terminals 105 and 106, as well as a capacitor C and an output coupled to the depletion mode MOSFET 130. The energy storage circuit 120 charges the capacitor C from the first rectifier output 105, 106 and delivers current to the depletion mode MOSFET 130 to delay discontinuation of the coil voltage signal VC responsive to a drop or discontinuation of the DC voltage signal VDC. The energy storage circuit 120 in the illustrated example includes a first diode with an anode coupled to the first DC output terminal 105, and a cathode coupled through a charging resistor to a first (e.g., upper) terminal of the capacitor C. A string of resistors is connected in parallel with the capacitor C, and the second (e.g., lower) terminal of the capacitor C is coupled to the second DC output terminal 106. The energy storage circuit 120 includes a second (e.g., output) diode with an anode coupled to the first terminal of the capacitor C, and a cathode coupled to the first DC output terminal 105. In operation when the capacitor voltage is less than the voltage at the cathode of the first diode, current flows from the first DC output terminal 105 through the first diode and the charging resistor to charge the capacitor C. In response to a drop or discontinuation of the DC voltage signal VDC, current flows from the first terminal of the capacitor C through the second diode to deliver current from the capacitor C to the depletion mode MOSFET 130. The second mode of operation of the energy storage circuit allows continued operation of the circuit 108 to provide the coil voltage signal VC to the coil 111, and delays discontinuation of the coil voltage signal VC in response to a drop or discontinuation of the DC voltage signal VDC.

The depletion mode MOSFET and control circuit 108 of the delay circuit 107 also includes a control circuit 140 having a control input 141. The control circuit 140 is coupled between the coil 111 and the source S of the depletion mode MOSFET 130. In operation, the control circuit 140 controls the coil current IC of the coil 111 based on a control signal CON of the control input 141. The control circuit 140 in the example of FIG. 2 includes a first transistor 142 (e.g., also labeled "Q"). The first transistor 142 is an NPN bipolar transistor with an emitter terminal coupled to the the first output 113 of the depletion mode MOSFET and control circuit 108, a base coupled to the control input 141, and a collector coupled through a resistor 143 (e.g., also labeled "R34") to a node 144. Another resistor 145 (e.g., also labeled "R31") is coupled between the node 144 and the control input 141. The control circuit 140 in this example also includes a second transistor 146 (e.g., also labeled "Q2") coupled in series with a further resistor 147 (e.g., also labeled "R21") between the node 144 and the first output 113 of the depletion mode MOSFET and control circuit 108. The second transistor 146 is a PNP bipolar transistor having a collector coupled to the first output 113 of the depletion mode MOSFET and control circuit 108, a base coupled to the lower terminal of the resistor 143 and the collector of the first transistor 142, and an emitter coupled to the node 144. The control circuit 140 further includes a current limiting resistor 148 (e.g., also labeled "R22") that is coupled between the source S of the depletion mode MOSFET 130 and the first output 113 of the depletion mode MOSFET and control circuit 108.

The overload protection circuit 124 in the example of FIG. 2 is a thermal switch having a thermal sensing element configured to sense an operating temperature of the depletion mode MOSFET 130, for example, coupled to a heatsink of the depletion mode MOSFET 130. The thermal switch overload protection circuit 124 also includes an electrical switch that is coupled between the source S of the depletion mode MOSFET 130 and the node 144. In operation, when the temperature of the depletion mode MOSFET 130 is below a threshold set by the overload protection circuit 124, the thermal switch remains closed, and the source S of the depletion mode MOSFET 130 is coupled to the node 144. In response to the temperature of the depletion mode MOSFET 130 rising above the threshold of the overload protection circuit 124, the thermal switch opens, and the source S of the depletion mode MOSFET 130 is coupled to the first output 113 of the depletion mode MOSFET and control circuit 108 only by the resistor 148. In this state, the coil current IC is limited to a first value set by the resistance of the resistor 148. In operation, the overload protection circuit 124 limits the coil current IC to a first value responsive to an overload condition detected by high temperature of the depletion mode MOSFET 130. The depletion mode MOSFET 130 in one implementation is installed on a heatsink with insulation, and the thermal switch monitors the heartsink temperature which represents the temperature of the depletion mode MOSFET 130.

In non-overloaded operation of the delay circuit 107, the thermal switch of the overload protection circuit 124 is closed, and the source S of the depletion mode MOSFET 130 is coupled to the node 144 in FIG. 2. In this condition, the current through the depletion mode MOSFET 130 is controlled by the regulator 134 and the short-circuit protection circuit 122. The output voltage sensing circuit 126 measures the coil voltage signal VC and provides a feedback signal proportional to the coil voltage signal VC. The output voltage sensing circuit 126 in one example includes a series resistor circuit with Zener diodes D3 and D4 coupled in series with resistors between the first and second outputs 113 and 114 of the circuit 108. The regulator 134 has an input configured to receive the feedback signal from the sensing circuit 126. In the example of FIG. 2, the regulator 134 is an optocoupler with an input diode coupled in parallel with a resistor of the output voltage sensing circuit 126. When the coil voltage signal VC is sufficiently higher than a threshold set by the Zener voltages of the series combination of the Zener diodes D3 and D4, a current conduction the input diode of the regulator 134, and turns on the bipolar transistor of the optocoupler regulator 134 to provide a corresponding voltage as the control signal CON. In steady state operation, the control signal CON turns on the first transistor 142, which conducts current through the resistor 143 from the source S of the depletion mode MOSFET 130. The source S of the depletion mode MOSFET 130 also conducts current through the resistor 148 from the source S to the coil 111 via the first output terminal 113 independent of the control signal CON. Conduction of the current through the resistor 143 provides a base-emitter voltage to the second transistor 146 causing the second transistor 146 to turn on and conduct a further current from the node 144 (e.g., from the source S of the depletion mode MOSFET 130) to the first output terminal 113. The output of the regulator 134 thus provides the control signal CON to the control input 141 to control the coil current IC to regulate the coil voltage signal VC based on the feedback signal. In normal steady state operation with no overloads or short-circuit conditions detected, and the regulator 134 regulates the coil voltage signal VC according to the feedback signal.

The control circuit 140 operates according to the control signal CON at the control input 141 to control the voltage of the node 144 which controls the gate-source voltage of the depletion mode MOSFET 130. The control circuit 140 provides coil voltage stabilization via the depletion mode MOSFET 130 controlled as an active current sink such that the depletion mode MOSFET 130 only conducts when the coil voltage VC is less than a specific value. When the coil voltage VC is greater than this value, the control circuit 140 limits the coil current IC. In one example, the control circuit 140 allows the depletion mode MOSFET 130 to output the coil current IC within a specific range, the upper limit is the coil close current of the coil 111, and the lower limit is less than the holding current of the coil 111.

If an output short circuit occurs (e.g., the coil 111 is short-circuited), all the input voltage VDC will be applied across the depletion mode MOSFET 130. In response, the voltage sense circuit 132 across the depletion mode MOSFET 130 provides a signal to the short-circuit protection circuit 122, which sets the control signal CON to substantially zero volts and limits the output current IC to the first value. The short circuit protection circuit 122 has an output coupled to the control input 141. The short-circuit protection circuit 122 in the example of FIG. 2 is an optocoupler configured to selectively provide the control signal CON to the control input 141 to limit the coil current IC to the first value responsive to a detected short-circuit condition. The voltage sensing circuit 132 senses a voltage of the depletion mode MOSFET 130 and provides a signal to an input diode of the optocoupler short-circuit protection circuit 122. An output bipolar transistor of the short-circuit protection circuit 122 is coupled to the control input 141 of the control circuit 140. The voltage sensing circuit 132 includes first and second Zener diodes D1 and D2 coupled in series with one another between the cathode of the short-circuit protection circuit diode and the first output terminal 113. A capacitor is coupled in parallel with the series combination of the Zener diodes D1 and D2. The voltage sensing circuit 132 includes a resistive divider circuit coupled between the drain D of the depletion mode MOSFET 130 and the first output terminal 113. One resistor of the divider circuit is coupled across the input diode of the short-circuit protection circuit 122. When the voltage of the depletion mode MOSFET 130 exceeds a threshold set by the Zener diodes D1 and D2, the short-circuit protection circuit 122 turns on its output transistor to provide the control signal CON to turn off the control circuit transistors 142 and 146. This limits the coil current IC to the first value set by the resistance of the resistor 148.

Figure 3:
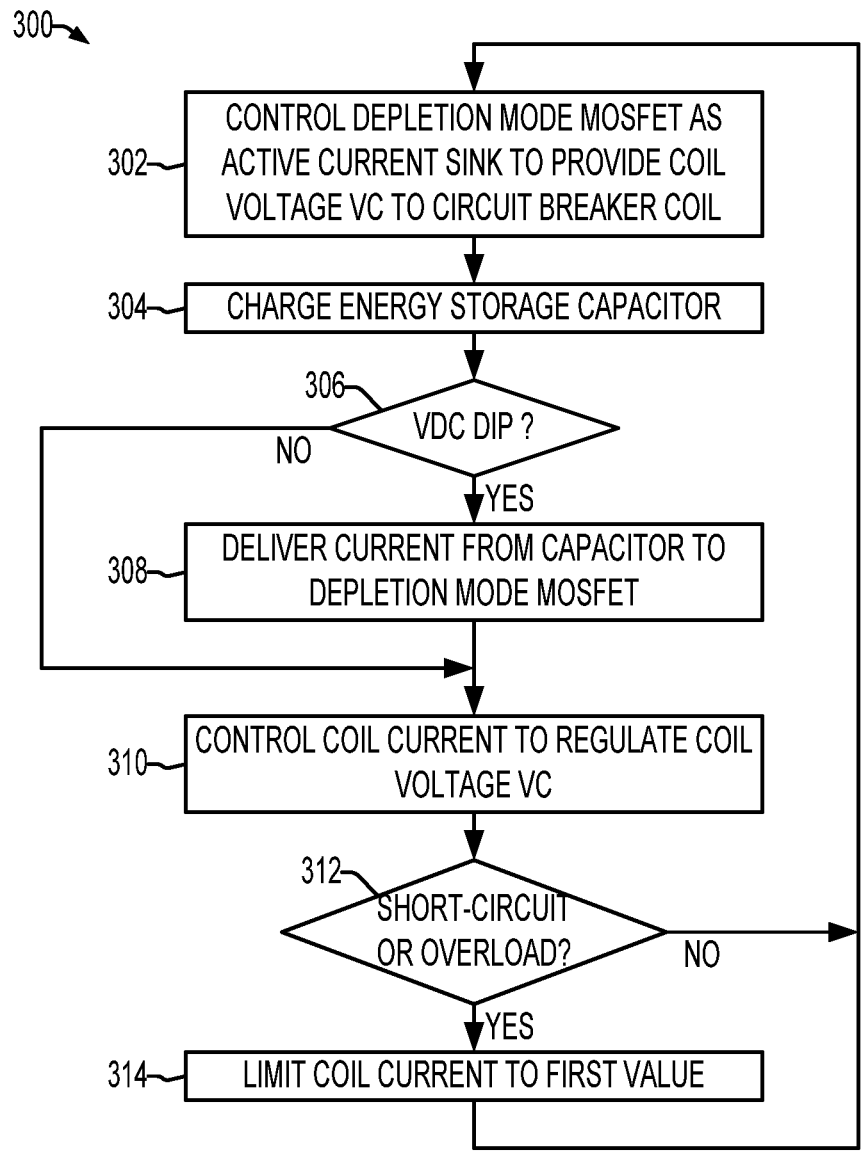
FIG. 3 is a flow diagram of a method.

FIG. 3 shows a method 300 of operating a circuit breaker, such as the circuit breaker 110 of FIG. 1. The method 300 includes controlling the depletion mode MOSFET 130 at 302 as an active current sink to provide the coil voltage signal VC to the coil 111 of the circuit breaker 110 to enable control of the contacts 112 of the circuit breaker 110. At 304, the method 300 includes charging the capacitor C from the DC voltage signal VDC. A determination is made at 306 as to whether the DC voltage signal VDC has dipped (e.g., been reduced or removed). If not (NO at 306), the method 300 proceeds to 310. If so (YES at 306), the method 300 continues at 308 with delivering current from the capacitor C to the depletion mode MOSFET 130 to delay discontinuation of the coil voltage signal VC responsive to the detected drop or discontinuation of the DC voltage signal VDC. At 310, the method 300 includes controlling the coil current IC of the coil 111 to regulate the coil voltage signal VC according to a feedback signal. A determination is made at 312 as to whether a short-circuit or overload condition has been detected. If not (NO at 312), the method returns to 302 as described above. Otherwise (YES at 312), the method includes limiting the coil current IC at 314 to a first value responsive to a detected short-circuit condition or a detected overload condition. The method 300 then returns to 302 as described above and operates in generally continuous fashion in one example implementation.

The electronic delay circuit 107 and the described method 300 provide improved system operation of the circuit breaker 110, including avoiding or mitigating opening of the circuit breaker contacts 112 in response to short voltage sags or interruptions in the supply DC voltage signal VDC. The energy storage circuit 120 delays contact opening for a non-zero time by using energy stored in the capacitor C to continue provision of the coil voltage signal VC such that when a short voltage sag or short interruption occurs, the breaker 110 will not open automatically, and the drive control firmware can decide whether to open the breaker 110. In addition, when the AC input voltage of the system (e.g., AC source 115 in FIG. 1) is high, the DC voltage signal VDC from the first rectifier 102 is also high. The depletion mode MOSFET and control circuit 108 in this example mitigates or avoids providing excessively high coil voltage signals VC by closed loop regulation of the coil voltage signal VC by the regulator 134 (FIG. 2). This helps mitigate high input voltage and overheating degradation of the circuit breaker coil 111. Moreover, the depletion mode MOSFET and control circuit 108 and the above method 300 respond to degraded or failing coil conditions through active short-circuit protection circuitry 122.

Various embodiments have been described with reference to the accompanying drawings. Modifications and changes may be made thereto, and additional embodiments may be implemented, without departing from the broader scope of the invention as set forth in the claims that follow. The specification and drawings are accordingly to be regarded in an illustrative rather than restrictive sense. The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   a first rectifier having a first rectifier output configured to provide a DC voltage signal;
   a second rectifier having a second rectifier output;
   an inverter having an inverter input coupled to the second rectifier output, and an inverter output configured to drive a motor load;
   a circuit breaker having a coil configured to enable control of a contact to selectively couple an input of the second rectifier to a power source responsive to a coil voltage signal applied to the coil; and
   a delay circuit having a depletion mode MOSFET controlled as an active current sink to provide the coil voltage signal based on the DC voltage signal.

2. The power conversion system of claim 1, wherein the delay circuit includes an energy storage circuit having an input coupled to the first rectifier output, a capacitor, and an output coupled to the depletion mode MOSFET, the energy storage circuit configured to charge the capacitor from the first rectifier output and to deliver current to the depletion mode MOSFET to delay discontinuation of the coil voltage signal responsive to a drop or discontinuation of the DC voltage signal.

3. The power conversion system of claim 2, wherein the delay circuit includes:
   a control circuit having a control input, the control circuit coupled between the coil and a source of the depletion mode MOSFET, the control circuit configured to control a coil current of the coil based on a control signal of the control input; and
   a short circuit protection circuit having an output coupled to the control input, the short-circuit protection circuit configured to provide the control signal to the control input to limit the coil current to a first value responsive to a detected short-circuit condition.

4. The power conversion system of claim 3, wherein the delay circuit includes an overload protection circuit configured to limit the coil current to the first value responsive to a detected overload condition.

5. The power conversion system of claim 4, wherein the delay circuit includes:
   an output voltage sensing circuit configured to measure the coil voltage signal and to provide a feedback signal; and
   a regulator having an input configured to receive the feedback signal, and an output to provide the control signal to the control input to control the coil current to regulate the coil voltage signal according to the feedback signal.

6. The power conversion system of claim 3, wherein the delay circuit includes:
   an output voltage sensing circuit configured to measure the coil voltage signal and to provide a feedback signal; and
   a regulator having an input configured to receive the feedback signal, and an output to provide the control signal to the control input to control the coil current to regulate the coil voltage signal according to the feedback signal.

7. The power conversion system of claim 2, wherein the delay circuit includes a control circuit having a control input, the control circuit coupled between the coil and a source of the depletion mode MOSFET, the control circuit configured to control a coil current of the coil based on a control signal of the control input.

8. The power conversion system of claim 7, wherein the delay circuit includes a short circuit protection circuit having an output coupled to the control input, the short-circuit protection circuit configured to provide the control signal to the control input to limit the coil current to a first value responsive to a detected short-circuit condition.

9. The power conversion system of claim 7, wherein the delay circuit includes an overload protection circuit configured to limit the coil current to the first value responsive to a detected overload condition.

10. The power conversion system of claim 7, wherein the delay circuit includes:
    an output voltage sensing circuit configured to measure the coil voltage signal and to provide a feedback signal; and
    a regulator having an input configured to receive the feedback signal, and an output to provide the control signal to the control input to control the coil current to regulate the coil voltage signal according to the feedback signal.

11. A system, comprising:
    a circuit breaker having a coil configured to enable control of a contact to selectively couple a load to a power source responsive to a coil voltage signal applied to the coil; and
    a delay circuit having a depletion mode MOSFET and an energy storage circuit, the depletion mode MOSFET controlled as an active current sink to provide the coil voltage signal based on a DC voltage signal, and the energy storage circuit having an input coupled to a drain of the depletion mode MOSFET, a capacitor, and an output coupled to the drain of the depletion mode MOSFET, the energy storage circuit configured to charge the capacitor from the DC voltage signal and to deliver current to the depletion mode MOSFET to delay discontinuation of the coil voltage signal responsive to a drop or discontinuation of the DC voltage signal.

12. The system of claim 11, wherein the delay circuit includes a control circuit having a control input, the control circuit coupled between the coil and a source of the depletion mode MOSFET, the control circuit configured to control a coil current of the coil based on a control signal of the control input.

13. The system of claim 12, wherein the delay circuit includes a short circuit protection circuit having an output coupled to the control input, the short-circuit protection circuit configured to provide the control signal to the control input to limit the coil current to a first value responsive to a detected short-circuit condition.

14. The system of claim 13, wherein the delay circuit includes an overload protection circuit configured to limit the coil current to the first value responsive to a detected overload condition.

15. The system of claim 13, wherein the delay circuit includes:
 an output voltage sensing circuit configured to measure the coil voltage signal and to provide a feedback signal; and
 a regulator having an input configured to receive the feedback signal, and an output to provide the control signal to the control input to control the coil current to regulate the coil voltage signal according to the feedback signal.

16. The system of claim 12, wherein the delay circuit includes an overload protection circuit configured to limit the coil current to the first value responsive to a detected overload condition.

17. The system of claim 12, wherein the delay circuit includes:
 an output voltage sensing circuit configured to measure the coil voltage signal and to provide a feedback signal; and
 a regulator having an input configured to receive the feedback signal, and an output to provide the control signal to the control input to control the coil current to regulate the coil voltage signal according to the feedback signal.

18. A method of controlling a circuit breaker, the method comprising:
 controlling a depletion mode MOSFET as an active current sink to provide a coil voltage signal to a coil of a circuit breaker to enable control of a contact of the circuit breaker;
 charging a capacitor from a DC voltage signal; and
 delivering current from the capacitor to the depletion mode MOSFET to delay discontinuation of the coil voltage signal responsive to a drop or discontinuation of the DC voltage signal.

19. The method of claim 18, further comprising:
 controlling a coil current of the coil to regulate the coil voltage signal according to a feedback signal.

20. The method of claim 19, further comprising:
 limiting the coil current to a first value responsive to a detected short-circuit condition or a detected overload condition.

* * * * *